United States Patent Office 2,851,360
Patented Sept. 9, 1958

2,851,360

CARBONATED SOFT DRINK AND CONCENTRATE FOR PRODUCING SAME

Isaac M. Diller, Brooklyn, N. Y., assignor to Henry Brout, Larchmont, N. Y.

No Drawing. Application July 12, 1954
Serial No. 442,919

2 Claims. (Cl. 99—78)

This invention relates to a carbonated soft drink and to a concentrate, i. e., an effervescive powder, for producing the same.

The patent literature is replete with concentrates which have been proposed to supply the demand for a palatable soft drink that is produced by the simple addition of powder to tap water. The reward for a desirable concentrate is, obviously, enormously lucrative; yet to date no salable concentrate has been made.

It is an object of the present invention to provide a concentrate of the character described which employs simple everyday inexpensive chemicals, but nevertheless produces a satisfactory tasty carbonated soft drink which is so palatable and "dry" that it strongly tempts repeated use even after thirst has been quenched.

It is another object of my invention to provide a concentrate of the character described which when added to water will cause protracted ebullition, for instance, up to half an hour.

It is another object of my invention to provide a concentrate of the character described which will create a carbonation that yields fine rather than coarse bubbles and when imbibed has a piquant taste and plentiful further ebullition.

It is another object of my invention to provide a concentrate of the character described which does not produce an excessively salty taste and does not require the use of excessive sweetener to conceal an unpleasant flavor.

It is another object of my invention to provide a concentrate of the character described whose ebulliating ingredients blend well with flavors conventionally employed in carbonated soft drinks.

It is another object of my invention to provide a concentrate of the character described which can yield a clear and sparkling carbonated soft drink.

It is another object of my invention to provide a concentrate of the character described including a novel carbonate factor under conditions which will achieve the foregoing desirable results.

It is another object of my invention to provide a carbonated soft drink of unusually pleasant taste that is "dry," that is to say, of a low order of sweetness so that it does not have a cloying taste nor does it leave the cloying after-taste such as is characteristic of most present-day sweet carbonated soft drinks.

It is another object of my invention to provide a carbonated soft drink including in solution a metallic radical which eliminates the heretofore lingering sweetness of a conventional carbonated soft drink.

Other objects of my invention in part will be obvious and in part will be pointed out hereinafter.

My invention accordingly consists in the carbonated soft drinks and combinations of compounds hereinafter described and of which the scope of application will be indicated in the appended claims.

I have found that unusual and unexpected results are obtained where there is employed for the carbonate factor a compound including in whole or in part calcium carbonate in conjunction with an acid factor so constituted and proportioned as to obtain a pH in the beverage prepared of between about 2.7 and about 4.5. The term "about" as employed with respect to pH herein denotes a maximum variance of 0.2. A carbonate factor of the foregoing nature is sparingly soluble in water and therefore does not tend to react in dry state, so that it has a long shelf life. When a concentrate employing this factor is added to tap water, the factor does not settle on the bottom or disperse through the solution as an insoluble powder to form a cloudy drink; but rather said factor completely dissolves as will be explained later and leaves a clear drink of appetizing appearance. Moreover, I have observed that due to the use of said carbonate under the conditions herein stated ebullition takes place over a comparatively long period of time, e. g., half an hour and is sufficiently slow to start bubbling so that the user is not required to stir in the powder rapidly and gulp down the drink before there is a major release of carbonation.

In addition, the ebullition which takes place is in the form of comparatively fine bubbles. Coarse bubbles such as commonly are found in the majority of carbonated soft drinks on the American market are not released. Indeed most of the carbon dioxide remains associated with the water so as to be present and released in the mouth in a most desirable manner. Over and above these advantages which at last enable a concentrate to yield a salable carbonated soft drink simply by mixing with plain water, I have discovered that the carbonated soft drink thus obtained is actually far superior to a pressure-packed, bottled carbonated soft drink in the quality of its taste. One of the advantages of my improved soft drink is the fine carbonation that is secured, that is to say, tiny bubbles rather than coarse bubbles. Another marked advantage is the soda flavor achieved. The presence of the calcium radical in the drink imparts a dryness which eliminates the sweetish cloying after-effect that characterizes most present-day flavored commercial drinks.

Basically, a concentrate embodying my invention includes any conventional acid factor and for the carbonate factor comprises calcium carbonate. More specifically, the carbonate factor may consist of calcium carbonate or may include calcium carbonate and some other carbonate e. g., ammonium bicarbonate, sodium bicarbonate, or magnesium carbonate, or it may be a double salt of calcium and magnesium carbonate, such as dolomite or, in general, any double compound which includes calcium carbonate and some other alkaline earth or alkali radical.

The carbonate factor must be present in an amount such that the calcium ion in the prepared beverage varies from 0.1% by weight to the solubility limit of the calcium ion under the conditions of use. In the most desirable form of my invention the calcium carbonate is present in predominant proportions in the carbonate factor. It is to be observed that to secure the desirable beverage characteristics aforementioned, the calcium ion must be present within the limits above prescribed.

As indicated above, the acid factor may be conventional. By way of example, I may employ citric acid, this being the preferred acid factor. I also can use any other suitable acidic material as, for instance, tartaric acid, or phosphoric acid, or derivatives of these three acids. For example, suitable typical derivatives of phosphoric acid are: metaphosphoric acid, hexose diphosphoric acid, or hemisodium phosphate such, for instance, as is mentioned in my copending application, Serial No. 418,745, filed March 25, 1954, for Effervescive Powders for Producing Protracted Ebullition. It will, of course, be understood that the acid factor may include mixtures of different acidic materials. Considerable experiment with the above acid factors has shown that they all function satisfactorily with my new carbonate factor.

In particular, I have observed that highly desirable results are secured where there is a partial replacement of citric acid by glucose diphosphoric acid. This specific substituent compound and others of a like nature, i. e., hexose phosphoric acids, upon adding to tap water hydrolyze to an extremely low pH, i. e., in the region of from 0.1 to 0.5. However, they do not have an effective reaction rate toward releasing carbon dioxide, until the pH is about 2.5 or more. The effective zone is coincident with the critical pH range of beverages having a calcium ion in solution. In addition, the hexose phosphoric acids are products which occur in nature and are healthful. These products add a highly desirable effect in taste over and above that of the essential oils.

The pH of the acid factor is critical. It must be less than about 4.5 and should be such that the pH of the carbonated soft drink resulting from dissolving the concentrate into tap water is not in excess of about 4.5 and in any event low enough to maintain the reaction products in solution. The acid factor should be present in an amount greater than that necessary to neutralize the carbonate factor, so that the carbonated soft drink produced is markedly on the acid side, having as already noted a pH not in excess of about 4.5. The actual pH secured will depend upon the flavor of the beverage, that is to say, some flavors require lower acid pH's than others. However, in no event should the pH of the drink exceed about 4.5 regardless of any external factors, e. g., temperature and the specific salts employed inasmuch as at higher pH's the desirable attributes of my invention—enhancement of flavor, refreshing effervescence, appetite whetting, dryness, etc. which are attributable to the calcium ion in solution—are effectively lost.

It is usually desirable to maintain the calcium carbonate and reaction products completely dissolved and this may be facilitated by adding soluble ammonium salts inasmuch as the presence of an ammonium ion in solution increases the solubility of the calcium salts. Nevertheless, clearness is not always essential since some carbonated beverages, e. g., orange drinks and lemon drinks, conventionally are often cloudy, and in these cases the presence of some undissolved calcium salts will be tolerated.

In the preferred form of my invention, the dry concentrate includes calcium carbonate mixed with anhydrous citric acid together with a sweetener, a flavor, coloring and, optionally, a carrier for the flavor. The citric acid is present in more than the amount necessary to neutralize the carbonate factor. The final pH desirably is about 3.0 to about 3.5 which is approximately the customary acidity of flavored carbonated soft drinks, depending on flavor.

The use of calcium carbonate in the carbonate factor would seem to be improper inasmuch as it is normally insoluble in tepid or cold water and therefore would create a cloudy beverage. Actually that is not the case. When the dry concentrate is stirred into cold water the citric acid dissolves and attacks the calcium carbonate which is very sparingly soluble. The calcium carbonate thereupon releases carbon dioxide. The carbon dioxide goes into solution in the water which then dissolves more calcium carbonate since the latter is more soluble in a carbon dioxide water solution than in plain water. The carbonate-acid reaction is slower than the rate of solution. Thus a carbonated soft drink is produced which effervesces continuously and in which the carbon dioxide is well dissolved rather than violently released. Such carbon dioxide therefore is not lost in a rapid chemical action.

As noted above, the calcium salt resulting from the reaction has a comparatively neutral or bland flavor and as a matter of fact adds a dry quality which in combination with the fine bubbles of carbon dioxide released from the drink makes a beverage superior to present dry bottled carbonated soda drinks. Indeed, I have observed upon tasting a drink prepared with the aid of this novel carbonate factor that it was difficult to resist the temptation of drinking down the entire glass rather than sipping the same and to indulge in far more of the beverage than was needed to quench the thirst.

By way of example, a soft carbonated drink embodying my invention is prepared from a mixture of the following ingredients:

Example I 5 grams citric acid
2 grams calcium carbonate
24 grams sugar
1 gram sorbitol
Flavor and coloring to suit The flavoring which conveniently is usually composed of oils first is mixed with the sorbitol which is a good carrier for the flavor and itself has a flavor value. The free flowing mixture thus provided is added to the other dry ingredients to form a dry mix. This dry composition is added to sufficient water to make up 8 ounces. The concentrate will completely dissolve in a very short time to form the carbonated soft drink. Ebullition in the form of fine bubbles continues for an extended period of time, i. e., in the order of one half hour, which is ample for normal purposes. The drink has a very fine soda taste, the bubbles are not released in sufficiently large size as to cause the drinker to belch. The drink is dry and has no cloyingly sweet after-taste. There is no salty flavor that has to be concealed by unusually large amounts of a sweetener.

I have set forth below other examples of my invention which show various modifications thereof.

Example II

For a dry mix to be added to enough water to make an 8-ounce carbonated soda beverage:

7 grams citric acid
1 gram tartaric acid
4 grams calcium carbonate
¼ gram ammonium carbonate
Flavor, coloring and sweetener to suit This example illustrates the use of plural acids in the acid factor. It also shows the employment of ammonium bicarbonate. Said salt provides an ammonium ion which aids in solubilizing the calcium carbonate and the calcium reaction products. Moreover, it is to be noted that ammonium bicarbonate, due to its quick reaction, furnishes a fast initial release of carbon dioxide so that the drink immediately starts to fizz. Furthermore, the quick reaction of the ammonium bicarbonate helps to disperse the other constituents of the dry powder concentrate throughout the beverage.

Example III

For a dry mix to be added to enough water to make an 8-ounce carbonated soda beverage:

5 grams citric acid
2 grams hemisodium phosphate
1 gram tartaric acid
4 grams calcium carbonate
¼ gram ammonium acid phosphate
Flavor, coloring and sweetener to suit The above example illustrates the use of hemisodium phosphate whose advantages have been noted in my aforesaid copending application. It also illustrates the employment of an ammonium salt other than a carbonate for the sole purpose of providing an ammonium ion in solution to assist in solubilizing the calcium salts.

Example IV

For a dry mix to be added to enough water to make an 8-ounce carbonated soda beverage:

7 grams citric acid
½ gram glucose diphosphoric acid
4 grams calcium carbonate
¼ gram ammonium bicarbonate
Flavor, coloring and sweetener to suit This example shows the incorporation of a hexose phosphoric acid the advantages of which have been pointed out above. Furthermore it illustrates another concentrate including ammonium bicarbonate.

Example V

A carbonated soft drink embodying my invention and prepared by present-day conventional methods, that is to say, by pressure carbonation rather than from a dry concentrate, includes one gram of calcium citrate to an 8-ounce drink, phosphoric acid being present in a sufficient quantity to adjust the pH to 3.1. The drink further includes the usual ingredients, to wit, water, flavoring, coloring, sweetener and pressure carbonation.

It thus will be seen that I have provided compounds and carbonated soft drinks which achieve the several objects of my invention and are well adapted to meet the conditions of practical use.

As various possible embodiments might be made of the above invention and as various changes might be made in the embodiments above set forth, it is to be understood that all matter herein described is to be interpreted as illustrative and not in a limiting sense.

Having thus described my invention I claim as new and desire to secure by Letters Patent:

1. For use in making a clear carbonated beverage, a dry effervescent concentrate including an acid factor predominantly comprising citric acid and a carbonate factor predominantly comprising calcium carbonate and also including a highly water-soluble potable carbonate, the acid factor being present in an amount sufficient to impart a pH to the beverage not in excess of 4.7, and the calcium carbonate being present in an amount sufficient to provide at least 0.24 gram of calcium in eight fluid ounces of the beverage and up to the solubility limit of the calcium carbonate under the conditions of use, the acid factor and carbonate factor being mixed as such in one another.

2. A clear carbonated beverage including calcium in solution in an amount of at least 0.1% by weight of the solution, the calcium being present as calcium carbonate and the amount of the calcium ranging up to the solubility limit of the calcium carbonate under the conditions of use, said solution having a pH not in excess of 4.7, said solution also including a highly water-soluble potable carbonate.

References Cited in the file of this patent

UNITED STATES PATENTS

| | | |
|---|---|---|
| 1,450,865 | Pelc | Apr. 3, 1923 |
| 2,071,841 | Kelling | Feb. 23, 1937 |
| 2,532,281 | Barch | Dec. 5, 1950 |
| 2,603,569 | Alther | July 15, 1952 |
| 2,639,238 | Alther | May 19, 1953 |